US008046326B2

(12) United States Patent
Ameling et al.

(10) Patent No.: US 8,046,326 B2
(45) Date of Patent: Oct. 25, 2011

(54) ADAPTIVE SYNCHRONIZATION OF BUSINESS OBJECTS

(75) Inventors: Michael Ameling, Dresden (DE); Bernhard Wolf, Dresden (DE)

(73) Assignee: SAP AG, Walldorf (DE)

( * ) Notice: Subject to any disclaimer, the term of this patent is extended or adjusted under 35 U.S.C. 154(b) by 318 days.

(21) Appl. No.: 12/508,939

(22) Filed: Jul. 24, 2009

(65) Prior Publication Data

US 2011/0022431 A1 Jan. 27, 2011

(51) Int. Cl.
*G06F 17/30* (2006.01)
(52) U.S. Cl. ........................................ 707/610; 707/623
(58) Field of Classification Search .................. 707/610, 707/611, 613, 620, 623, 626, 634, 637, 655
See application file for complete search history.

(56) References Cited

U.S. PATENT DOCUMENTS 7,206,796 B2 * 4/2007 Hansen et al. ................ 707/620

OTHER PUBLICATIONS

European Search Report for Application No. 10 007 400.4, dated Nov. 15, 2010, 6 pages.
Michael Ameling et al., "Experimental Evaluation of Processing Time for the Synchronization of XML-Based Business Objects," 20th International Conference on Database and Expert Systems Applications (DEXA '09), Aug. 31, 2009, pp. 255-262.
Michael Ameling et al., "Synchronization Strategies for Replicated Business Objects with Temporal Consistency Constraints," 4th International Conference on Software and Data Technologies (ICSOFT 2009), Jul. 26, 2009, Sofia, Bulgaria, 8 pages.
Michael Ameling et al., "Adaptive Synchronization of Business Objects in Service Oriented Architectures," 8 pages.
Michael Ameling et al., "A Cost Model for Efficient Business Object Replication," 2009 International Conference on Advanced Information Networking and Applications Workshops (WAINA), May 26, 2009, Bradford, United Kingdom, 6 pages.
Christian Plattner et al., "Ganymed: Scalable Replication for Transactional Web Applications," Middleware 2004, ACM/IFIP/USENIX 5th International Middleware Conference, Oct. 18, 2004, Toronto, Ontario, Canada, pp. 155-174.
Marta Patino-Martinez et al., "Middle-R: Consistent Database Replication at the Middleware Level," ACM Transactions on Computer Systems, vol. 23, No. 4, Nov. 2005, pp. 375-423.
European Office Action for Application No. 10 007 400.4, dated Jul. 18, 2011, 6 pages.
Daniel H. Bianchin, "Mastering SAP NetWeaver PI Throughput with Message Packaging," Oct. 16, 2007, [retrieved from: http://www.sdn.sap.com/irj/scn/go/portal/prtroot/docs/library/uuid/10b54994-f569-2a10-ad8f-cf5c68a9447c], 23 pages.

* cited by examiner

*Primary Examiner* — Cam-Linh Nguyen
(74) *Attorney, Agent, or Firm* — Fish & Richardson P.C.

(57) ABSTRACT

In some implementations, a method includes changing a master business object that is resident at a first location on a network, generating a change message for changing a replicated business object, the replicated business object being based on the master business object and being resident at a second location on the network remote from the first location, determining an update duration for updating the replicated business object, incorporating the change routine into a synchronization message when the update duration is less than a temporal constraint, and transmitting the synchronization message from the first location to the second location to update the replicated business object based on the synchronization message.

17 Claims, 9 Drawing Sheets

| STRUCTURE | | | | | | | 502 |
|---|---|---|---|---|---|---|---|
| N | L | K | A | W | V | F | |
| 865 | 27 | 1,345 | 27 | 899,455 | 13 | 12 | ... |
| $N_1$ | $N_2$ | $N_3$ | $N_4$ | $N_5$ | $N_6$ | $N_7$ | ... |
| 3 | 12 | 43 | 23 | 44 | 33 | 12 | 23 |

| SIZE | 380.233 Byte | 520 |
|---|---|---|

| COMPLETENESS | 63% (391%) | 522 |
|---|---|---|

| ACCESS | read ratio | 3.78 $h^{-1}$ | write ratio | 1.18 $h^{-1}$ | 524 |
|---|---|---|---|---|---|

| OCCURRENCES | 589,333 | 530 |
|---|---|---|

*Fig. 5*

SENDER 602

| $a_l$ in ns | $b_\lambda$ in ns | $c$ in ms | $d$ in ms | $e$ in ns |
|---|---|---|---|---|
| 43.531 | 47.596 λ | 106.24 | 145.87 | 90.684 |

TRANSPORT 604

| $B_W$ in MBit/s | $L_W$ in ns | $R_F$ |
|---|---|---|
| 5.443 | 127  610 | 12 |

608

RECEIVER 606

| $a_l$ in ns | $b_\lambda$ in ns | $c$ in ms | $d$ in ms | $e$ in ns |
|---|---|---|---|---|
| 21.765 l | 23.798 λ | 58.119 | 72.934 | 45.342 |

ADAPTIVE SYNCHRONIZATION OF BUSINESS OBJECTS

BACKGROUND

In business applications, such as enterprise resource planning or supply chain management, a business object represents a container for storing complex business data. In particular, a business object represents a type of a uniquely identifiable business entity, or object instance, described by a structural model. Processes operate on business objects. Business objects can provide a specific view on some well-defined business content. Properly implemented, business objects are free of redundancies.

Business applications can be hosted at application servers. The applications are locally distributed and replicated to achieve scalability, fast local access, and efficient processing for the clients. Business objects can be operated on using either read access or write access. Read access is defined as reading data from a business object, while write access is defined as creating, updating, or deleting the business object. The creation of a business object includes generating a business object instance (e.g., from a master data business object) that did not exist before the current instantiation. The content in the newly created business object can be equal or similar to an existing business object instance, and includes at least a unique identifier that differs from that of all other business object instances. The deletion of a business object instance includes permanently removing the complete content of the business object instance from the system. The updating of a business object includes adding elements to a business object and deleting or modifying elements within the business object.

SUMMARY

Implementations of methods in accordance with the present disclosure include methods for adaptively synchronizing a change to a business object. In some implementations, a method includes changing a master business object that is resident at a first location on a network, generating a change message for changing a replicated business object, the replicated business object being based on the master business object and being resident at a second location on the network remote from the first location, determining an update duration for updating the replicated business object, incorporating the change routine into a synchronization message when the update duration is less than a temporal constraint, and transmitting the synchronization message from the first location to the second location to update the replicated business object based on the synchronization message.

In some implementations, the update duration is determined based on a first duration corresponding to a time required to identify changes to the master business object and assemble the synchronization message at the first location, a second duration corresponding to a time required to transfer the synchronization message from the first location to the second location, and a third duration corresponding to a time required to process and integrate changes to the replicated business object at the second location.

In some implementations, the method further includes generating a business object profile, wherein the update duration is determined based on the business object profile.

In some implementations, the method further includes generating a system profile based at least in part on the network, wherein the update duration is determined based on the system profile.

In some implementations, the method further includes determining that an existing synchronization message is present, adding the change message to the existing synchronization message when a sum of the update duration and a second update duration is less than the temporal constraint, the sum of the update durations being associated with the existing synchronization message, and transmitting the existing synchronization message from the first location to the second location to update the replicated business object based on the existing synchronization message.

In some implementations, the method further includes determining that an existing synchronization message is present, and generating the synchronization message as a new synchronization message when a sum of the update duration and a second update duration exceeds the temporal constraint, the second update duration being associated with the existing synchronization message.

In some implementations, the change routine includes one of a complete change of the replicated business object, and an incremental change of the replicated business object.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
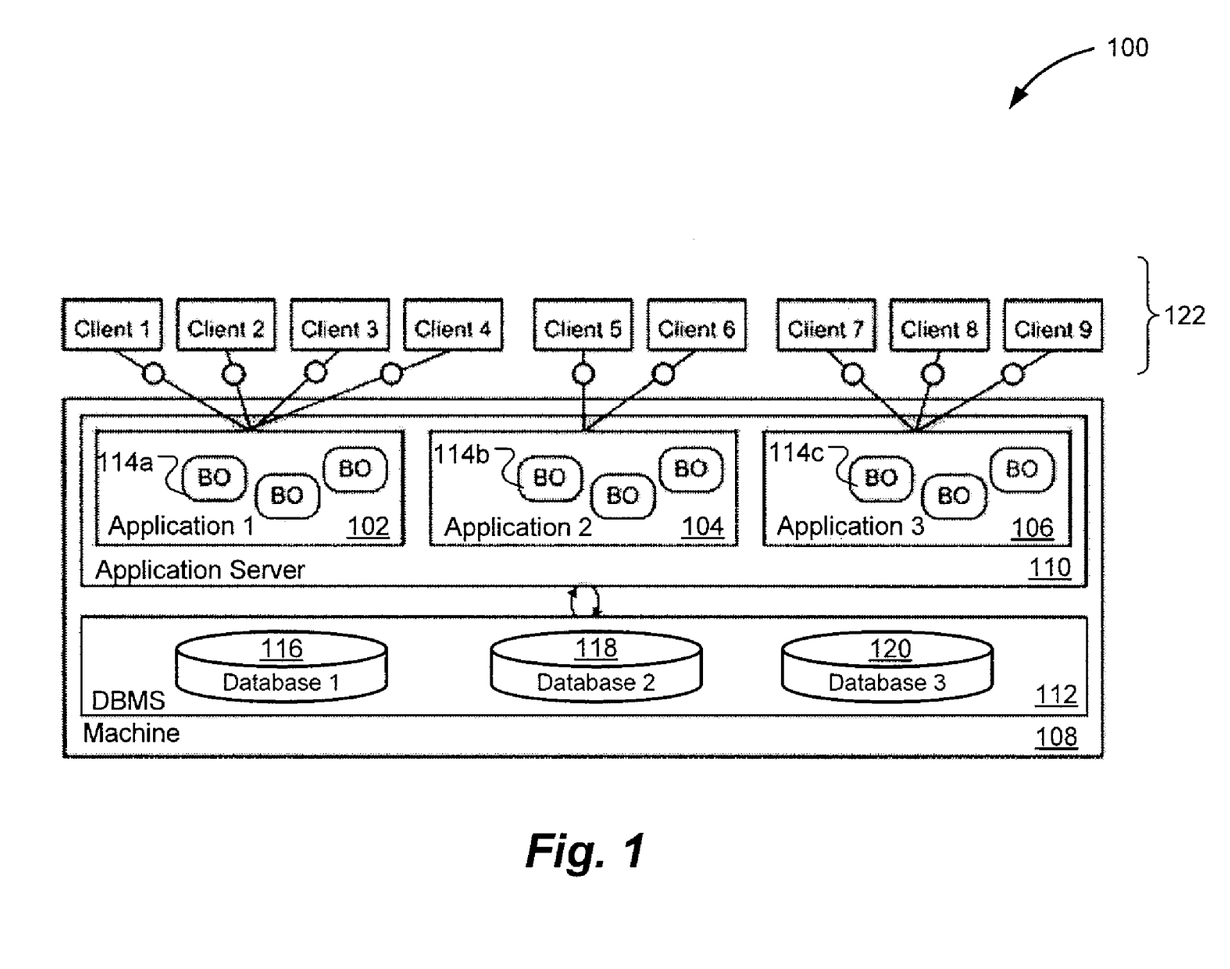
FIG. 1 is a block diagram of an exemplar multi-tier architecture for business applications.

Referring now to FIG. 1, a block diagram of a multi-tier architecture 100 for business applications is provided. The architecture 100 can synchronize, optimize, replicate, and bulk (e.g., combine) business object data and related messaging to reduce network traffic and provide increased system reliability. In addition, the architecture 100 can ensure that temporal constraints for business objects are adhered to, while providing improved synchronization speeds for updating the business objects. With regard to business objects, in particular, temporal constraints correspond to a maximum time until a particular business object replica has to be updated when a change was executed at a master business object. For example, the maximum distance can be defined as a temporal distance $\Delta t$, where t represents time. The maximum temporal distance for a particular business object may depend on the business object type. If the temporal distance is exceeded in any operation, the business object instances may become inconsistent and therefore invalid.

In general, the structure of a business object is specified by the business object type, such as a Customer business object or a Sales Order business object, for example. Each instance of a particular business object type has the same structure, but can vary widely with respect to contained elements due to optional elements and cardinalities included in each instance of the business object type. For example, a business object instance that includes a large number of optional elements may be large in size and depth compared to a business object instance without optional elements. In addition, the size of business objects can be increased by attaching documents (e.g., email, pdf documents, orders, specifications, etc.). Consequently, the architecture 100 may be required to sustain and update a large number of changing objects while keeping the business applications communicating efficiently and accurately.

With continued reference to FIG. 1, the business applications may include one or more applications including, but not limited to an enterprise resource planning (ERP) application 102, a customer relationship management (CRM) application 104, or a supply chain management (SCM) application 106. Each application 102, 104, and 106 may be based on multi-tier architectures. In particular, the multi-tier architecture 100 depicts a three tier architecture for three distributed business applications 102-106. At a middle-tier, a single machine 108 includes an application server 110. The application server 110 may host one or more application program interfaces (APIs) and/or applications to expose business logic or processes for use in third-party applications. The application server 110 may provide services, hardware resources, and software framework to host services. In the depicted example, the application server 110 hosts three applications 102, 104, and 106 (e.g., two CRM applications and one ERP application, one CRM application, one ERP application, one CRM application, and one SCM application, etc.).

The applications 102-106 can share resources in architecture 100, but may be separated by business need and/or by customer. For example, each application can store business objects in a data base management system (DBMS) 112, where each application 102-106 can access and modify the business objects involved in particular business processes in the context of one or more transactions.

The DBMS 112 exists below the application server 110 and provides transactional access. Each application has its own database (or its own tables) within the DBMS 112, which remains in the backend to allow a clear separation of components for reusability. The application server 110 and the DBMS 112 share the responsibility of maintaining the state of business objects. In some implementations, business objects are assembled from several database records to provide a more appropriate abstraction for application programming. The DBMS 112 may provide the persistence of business objects and, during service execution, the application server 110 can load the business objects 114 from the DBMS 112 into its own memory cache and, thus, local access time can be improved.

Each application 102-106 can execute a business process by accessing one or more business objects 114a, 114b, or 114c and performing a read access or a write access or both on the identified objects. Similar operations can be performed with other business objects in the architecture 100 or stored in DBMS 112. In some implementations, version management can be applied to business objects in the architecture 100 or DBMS 112 to distinguish between different versions of the business objects.

The applications 102-106 each store respective business object data persistently using the common database management system 112. However, each application 102-106 stores business object data in a separate database or in some cases in a separate set of tables within a main database. For example, the DBMS 112 includes a first database 116, a second database 118, and a third database 120. The first database 116 corresponds to business object data used in the first application 102. The second database 118 corresponds to business object data used in the second application 104. The third database 120 corresponds to business object data used in the third application 106. The business objects 114a-c can be accessed and modified via service interfaces (not shown).

In some implementations, the architecture 100 can allow access to the same business object instances across all applications. For example, the architecture can replicate business object instances amongst several applications. If a business object is configured to be replicated, separate business object copies (e.g., replicas) are created at all applications using that business object instance. Moreover, the business objects can be cached at the middle-tier (e.g., application server 110) per application to allow efficient processing of business data. According to the replicated environment, the business objects 114 can also be synchronized between the applications 102-106.

The architecture 100 provides a number of clients 122 access to application data and business object data through applications 102-106. The applications 102-106 are typically locally distributed and replicated to achieve scalability, fast local access, and efficient processing for the clients 122. The clients 122 can connect to the applications 102-106 using messaging, access calls, and other request protocols.

As is typical, the techniques and components described herein may be implemented within an Enterprise Service Architecture (ESA) environment, often termed a Service Oriented Architecture (SOA). In certain implementations, SOA can be considered a blueprint for an adaptable, flexible, and open architecture for developing services-based, enterprise-scale business solutions. The respective enterprise service is typically a series of web services combined with business logic that can be accessed and used repeatedly to support a particular business process. Aggregating such web services into business-level enterprise services may provide a more meaningful foundation for the task of automating enterprise-scale business scenarios. The composite application framework comprises rules framework, design tools, methodologies, services and processes, an abstraction layer for objects, and user interface and process pattern libraries. The composite application framework supports model-driven application composition, so a user may build applications and/or implement supply chain policies with as little programming as possible, which often results in reduced development and deployment time for new/modified applications and business-pattern-oriented integration.

Figure 2:
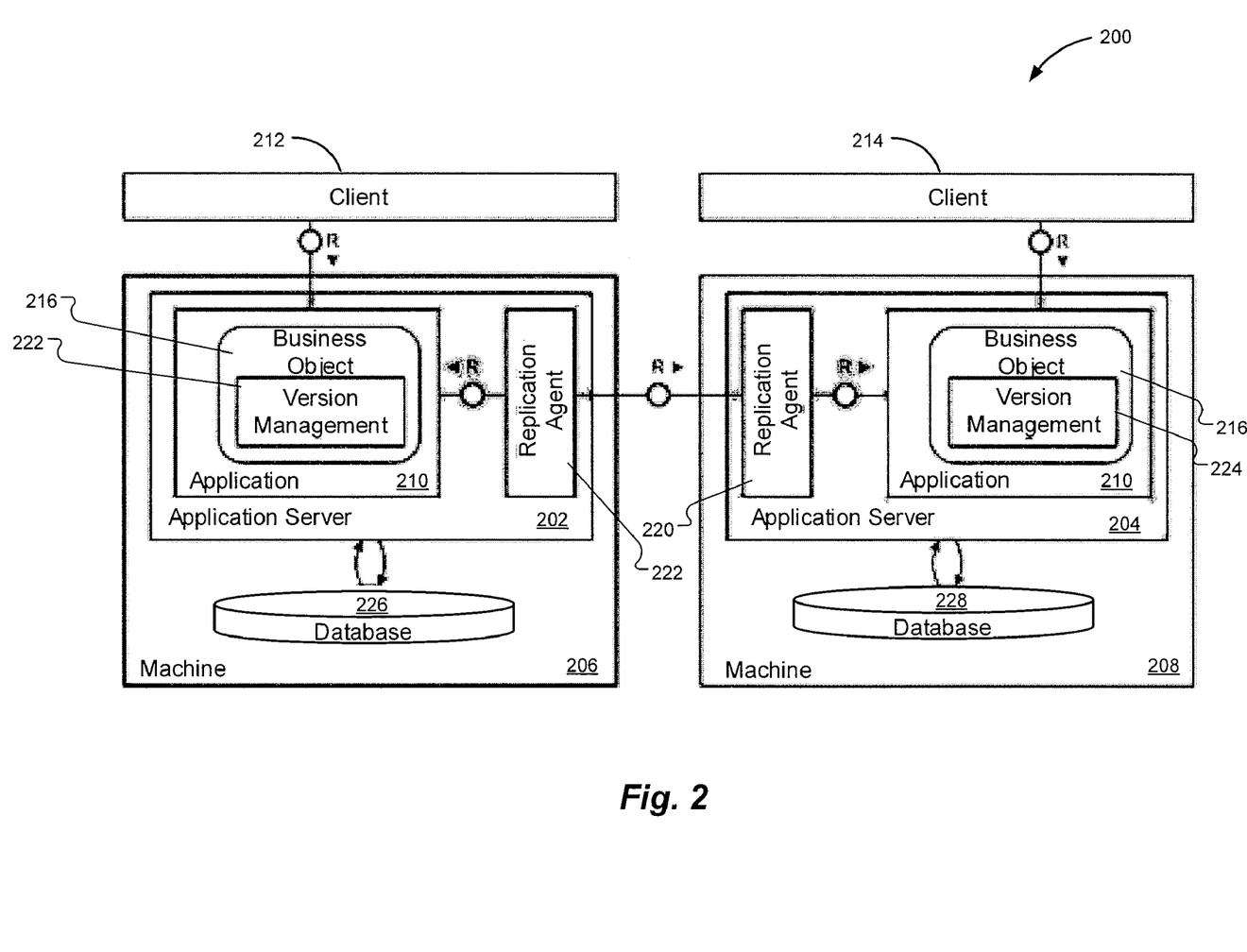
FIG. 2 is a block diagram of an exemplar distributed multi-tier architecture in accordance with implementations of the present disclosure.

Referring now to FIG. 2, a block diagram of an exemplar distributed multi-tier architecture 200 is provided. The architecture 200 represents a replicated environment. In particular, the architecture 200 includes two applications servers 202, 204 running on separate machines 206, 208, respectively. In this exemplar diagram, both application servers 202, 204 host the same application 210. In operation, the distributed multi-tier architecture 200 represents a system that includes a set of machines 206, 208 managing a set of business objects 216, and a set of clients 212, 214. A client 214 can access the business objects 216 using web services to create, read, update, or delete the business objects.

In some implementations, clients 212, 214, and others may be globally distributed resulting in increased latency times if, for example, several business object updates were requested from multiple clients. The architecture 200 can provide a replicated system to achieve a global scalability and provide fast local access. Several instances of business applications can be hosted at one application server or can be replicated across different application servers. Because the replicated data within the applications has to be up-to-date and consistent, replica control is strongly required.

In this example, the application 210 has been replicated and replicas of one business object instance 216 are maintained by application servers 202, 204 hosted at two different machines 206, 208, respectively. Due to the replication in both applications 210, copies of the same business object instances 216 are functioning separately, yet maintained at a master data business object. Accordingly, when the business object instance 216 is modified, all replicas of that business object instance are updated. For example, if a change is made to a business object instance 216 in application server 202, a replication agent 218 can replicate the change across all business object instances. Similarly, if a change is made to a business object instance 216 in application server 204, a replication agent 220 can replicate the change across all business object instances. The replications and modifications can be tracked independently by a version management module 222 in the application server 202 and a version management module 224 in the application server 204.

In some implementations, the business objects 216 are cached at the application level and stored in databases 226, 228. The clients 212, 214 may have read access to the local business objects in the databases 226, 228, respectively, using the service interface provided by the application logic. For example, the client 212 may have read access to the business object 216 cached at application level 210 using a service interface provided by application 210. The clients 212, 214 can also request write access to business objects, however, the architecture 200 allows execution at one particular server, namely, the master server. Thus, write operations can be performed at the master server since the master server holds the primary copy of the business object. Other servers in the architecture 200 may be secondary servers that function to forward change requests to the master server. In the event that a conflict occurs between parallel write requests referring to different replicas of the same business object, the master server can resolve the conflict.

After the execution of a change in a master business object, the changes can be forwarded to all secondary servers. The process to forward and execute the changes to all copies of a business object is called synchronization. The synchronization process can be handled in the replication agents 218, 220. Synchronization generally includes sending messages to update the business object instances. The synchronization process may begin when a client transaction is committed and a new version of a business object exists. Each change generally includes one synchronization process. The synchronization process ends when all replicas of the business object 214 are updated to a new version.

Figure 3:
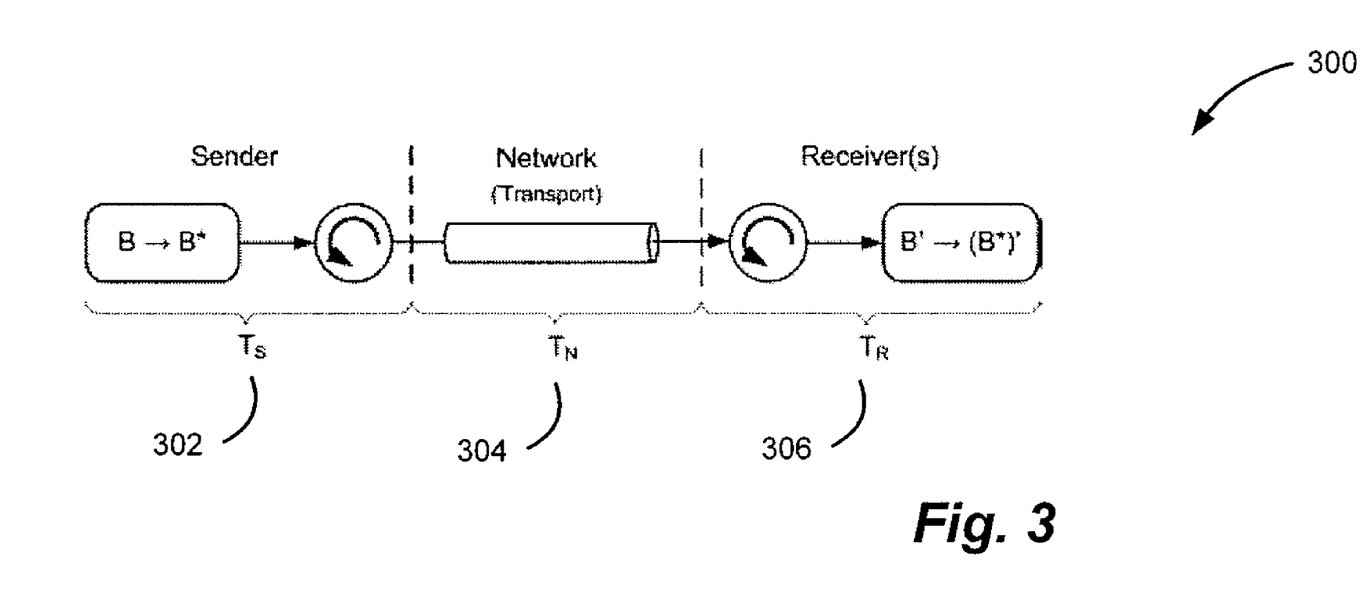
FIG. 3 is a block diagram depicting an exemplar synchronization process that can be executed in accordance with implementations of the present disclosure.

Referring now to FIG. 3, a block diagram depicts an exemplar synchronization process 300 that can be executed in accordance with implementations of the present disclosure. For example, the synchronization process can be executed on business objects. Business objects can be complex and vary greatly in structure. As such, the synchronization process may involve any number of synchronization messages and associated times to transfer the synchronization messages. At some point, there exists an efficiency trade-off between sending (i) the changes of a business object, or (ii) a full copy update of the business object. In the first case (i), additional parsing may be performed at the master server to transfer changes in smaller messages. Furthermore, the changes generally should be integrated on each secondary server as well. In the second case (ii), the master server can send the full business object resulting in larger messages, but there is typically no processing at the secondary servers since the object is newly replicated.

The synchronization process 300 includes a time based division across a sender ($T_S$) 302, a network ($T_N$) 304, and a receiver ($T_R$) 306. The sender time ($T_S$) 302 includes the time for all processes at the sender. The network time ($T_N$) 304 includes the time for the transport of the synchronization message. The network can address several receivers in parallel. In some implementations, the longest transport time is relevant to reach consistency of the complete system. In other implementations, consistency can be reached separately for a number of receivers and thus the transport time for each receiver may be relevant for the consistency. The receiver time ($T_R$) 306 includes the time for processing the message and updating the business object to (B*)' at one receiver.

A defined cost model may include a total time representing the time at a sender, a receiver, and time during transport. The cost model presents a sum of the time needed for all process steps for synchronization of a changed business object. A lazy primary copy approach for replication can be used. Consequently, synchronization from a master business object to a set of replica business objects can be performed.

In the exemplar process 300, an update is made in a distributed multi-tier system. The system 100, 200 can determine whether a full replacement, or simply an update to a particular business object is required. As shown, the business object (B) is modified in some way to create (B*) at its master data business object. The sender time ($T_S$) 302 begins once the transaction of a client is committed and the business object (B) is changed to business object (B*). The sender time ($T_S$) 302 ends when a synchronization message is assembled and passed to the infrastructure. To update a replicated business object, the content is generally preprocessed at the sender (e.g., master server) and a message is assembled. The message is then transferred to allow the business object to be integrated or replaced at the receiver.

Figure 4A:
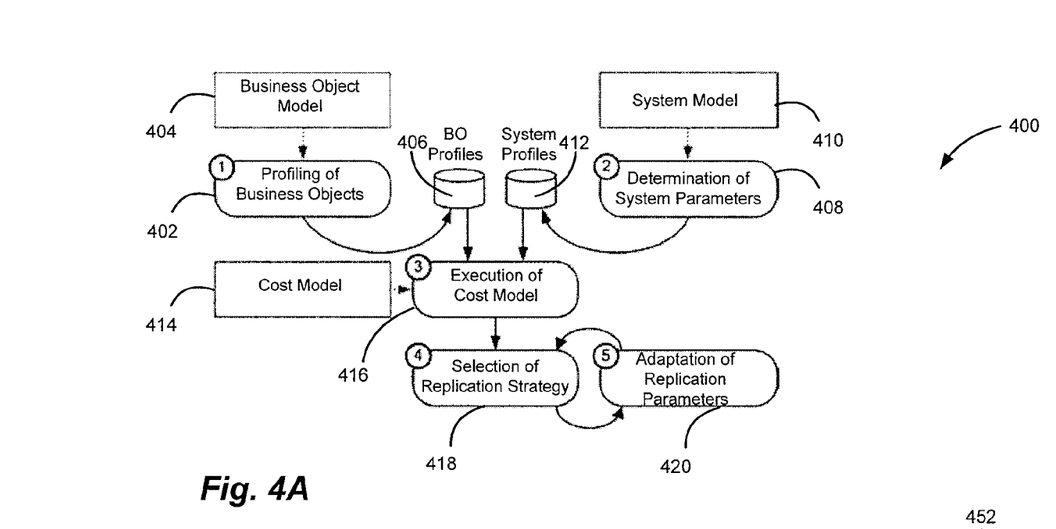
FIG. 4A is a block diagram illustrating an exemplar architecture that can be implemented to synchronize business objects.

Referring now to FIG. 4A, a block diagram is depicted showing an exemplar architecture 400 that can be implemented to synchronize business objects. The architecture 400 may be implemented to achieve an adaptive synchronization process for business objects in an application server, where the application server supports an efficient update process for replicated business objects. Briefly, the architecture 400 includes profiling business objects, determining system parameters, executing a cost model, configure replication strategies, and performing a replication.

The architecture 400 includes a business object profile routine 400 that can be executed by a business object model 404. The business object model 404 profiles business objects, including their attributes, methods, interfaces, and relationships. In some implementations, the business object model 404 defines the parameters used for profiling business objects and defines parameters that influence the synchronization process. The business object model 404 may include any number of parameters. All parameters used in a profile may compose the business object model 404 that can be used as a foundation for profiling all business objects. In some implementations, each business object instance can be profiled individually. Profiles can be stored in a business object profile repository 406. An example of a profile is described below with reference to FIG. 5.

Parameters can, for example, include the structure model, completeness criteria, access ratio criteria, and value occurrences of business objects. The structure of business objects allows the architecture 100, for example, to determine processing times for business objects at both a sender and a receiver side. The structure model includes the number of elements, the element sizes, and the element positions within the business object. Thus, the architecture 100 can deduce the sender time ($T_S$) and the receiver time ($T_R$) based on the data elements in the synchronization messages.

The completeness criterion expresses the use of mandatory elements according to a schema. Therefore, empty values and non used elements can be identified. Since optional elements and cardinalities increase the use of elements, optional elements and cardinalities can also be profiled.

The architecture 100 can also profile the access of business objects by client applications since the access events are also associated with a time value. For example, read access event can affect the priority of synchronization of business objects. In particular, a small read ratio on a business object can be considered as low priority while a large read ratio on a business object can be considered as high priority. Similarly, a write access event can also affect the priority of synchronization of business objects.

The architecture 100 can also profile the value occurrences in a business object. The value occurrences indicate the number of business object instances existing within a system. This value typically does not relate to simply one business object instance, but may instead relate to business object classes where classes can dictate value occurrences that are responsible for influence on the number of messages to expect, for example.

A system parameter determination routine 408 can be executed by a system model 410. The system model 410 provides parameters describing costs for a single process for synchronization between a sender and a receiver. The architecture 400 can, for simplification purposes, assume that each receiver behaves equally. Other system parameters may include times for identifying changes and message assembling (e.g., creation of a SOAP message) replication factors (RF), bandwidth, (BW), and latency (LW). Other parameters are possible. The system parameters can be stored in a system profiles repository 412. An example of parameter determination is described below with reference to FIG. 6.

As an example, the architecture 100 can determine a first system parameter that describes the time a replication agent requires to compare a new version of a business object with a previous version of the same business object. The first system parameter may identify all replication changes and time required for replication. Although the architecture 100 can, for example, parse a business object using a single parameter for processing each element of the business object, additional parameters can be easily added since the routines executed by the architecture 400 are executed sequentially.

After determining system parameters, a cost model routine 416 can be determined and executed by a cost model 414. The cost model 414 can use the structure parameters of the business object profiles 406 and other system profile data 412 to determine the costs for the synchronization process. In general, the defined cost model 414 presents a sum of the time needed for all process steps for one synchronization of a changed business object. In some implementations, a lazy primary copy approach for replication can be used. In such implementations, the synchronization from a master to the replicas is considered. In some implementations, the cost model 414 can be used in other replication strategies. For example, additional process steps can be easily inserted into the sequence of synchronization process steps.

A replication strategy 418 is selected for replicating business objects. The result of this can be used to choose and configure the replication strategy to achieve an efficient replication process. In general, the architecture 400 can use the cost model 414 and profiles 406, 412 to support an efficient configuration of the synchronization process. Two examples for selecting the replication strategy include (i) sending a full copy of a business object versus sending a delta (e.g., the amount of changes between two different business object versions) (ii) bulking (e.g., combining) business object changes into fewer message. In some implementations, both strategies "full" and "delta" can be combined. A detailed description of the selection of replication strategy process is provided in reference to FIG. 4B below.

An adaptation of the replication parameters routine 420 can be executed during runtime. For example, the architecture 400 can update business objects and system profiles and all associated replication parameters when performing an adaptation of the replication parameters.

Figure 4B:
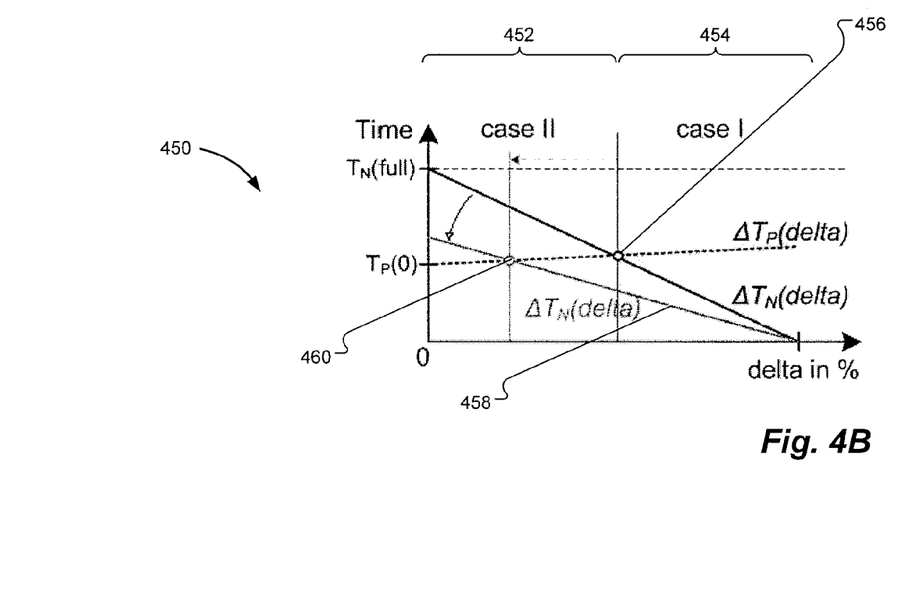
FIG. 4B illustrates an exemplar decision model for selecting a replication strategy in accordance with implementations of the present disclosure.

Referring now to FIG. 4B, an exemplar decision model 450 is depicted for selecting a replication strategy in accordance with implementations of the present disclosure. The model 450 charts time required to modify a business object over business object change percentage required (e.g., delta in %). In particular, the model 450 depicts a summary of a comparison for all delta sizes shown throughout (i) 452 and (ii) 454. The processing times ($T_P$) and the transfer times ($T_N$) can be determined based on the delta size and can be compared. The comparison may be used to select either case (i) 452 or case (ii) 454. The processing time ($T_P$) summarizes the process steps of the synchronization at the sender ($T_S$) and at the receiver ($T_R$). All values for case (i) [$T_P$(full), ($T_N$(full)] and case (ii) [(T$_P$(delta), (T$_N$(delta)] can be determined using the cost model based on profiling.

The decision either to use case (i) 452 or case (ii) 454 can depend on the trade-off between the time that can be saved at transfer (ΔT$_N$), and the additional effort for processing (ΔT$_P$). The trade-off and the break-even-point to switch between replication strategies can be determined. The relative size of the delta compared to the full size of the business object can be considered. The function ΔT$_P$(delta) defines the processing time that can be saved sending a full copy where ΔT$_P$(delta)=T$_P$(delta)−ΔT$_P$(full). The function ΔT$_N$(delta) defines the transfer time that can be saved sending a delta message where ΔT$_N$(delta)=T$_N$(full)−ΔT$_N$(delta). For simplification, it can be assumed that the particular business object has a fixed size. Therefore, both functions may depend only on the size of the delta since the size of a full copy is constant if no additional elements are added to the business object. Thus, the transfer time T$_N$(full) is constant.

The function ΔT$_N$(delta) decreases with a larger delta size since less transfer time can be saved sending a delta message. The space between T$_P$(0) and T$_N$(full) represents the transfer time of a full copy (e.g., ΔT$_N$(0)=ΔT$_N$(full)). In this case, ΔT$_N$ equals the maximum transfer time that can be saved. No time can be saved when the delta equals a full copy (e.g., ΔT$_N$(100%)=0). The function ΔT$_P$(delta) may slightly increase since a larger delta results in more effort for processing in the second case (ii) "delta." The space between zero and T$_P$(0) represents the processing time for an empty delta message (e.g., ΔT$_P$(delta)). Finally, the intersection 456 of the functions ΔT$_N$(delta) and ΔT$_P$(delta) equals the delta value to switch between the two cases. If the saved transfer time ΔT$_N$(delta) sending a delta exceeds the saved additional effort ΔT$_P$(delta) sending a full copy, then case (ii) is used because it is more efficient. Case (ii) 452 is represented to the left of intersection 456 (e.g., ΔT$_N$(delta)>ΔT$_P$(delta). If the saved transfer time ΔT$_P$(delta) exceeds the saved additional effort ΔT$_N$(delta), then case (i) is used because it is more efficient. Case (i) 454 is represented to the right of intersection 456 (e.g., ΔT$_P$(delta)≧ΔT$_N$(delta)).

The previous example was given for one business object with a fixed size. The method to find the trade-off considers the relative delta. The structure of the business object was fixed and is reflected in the cost model 414. In another example, a business object of a smaller size can be changed. In this example, for simplification, the function for the saved processing time ΔT$_P$(delta) may remain the same as above. The smaller size of the business object may result in a decrease of ΔT$_N$(full). The function ΔT$_N$(delta) 458 is below the previous function. An intersection 460 of the functions ΔT$_P$(delta) and ΔT$_N$(delta) moves to a smaller delta resulting in an earlier switch from case (ii) 452 to case (i) 454. The introduced cost model 414 and the profiling allow predicting both functions for any business object. The system can use this information to determine to either send a full copy of the business object or a delta message for each business object based on the size of the delta and the structure of the business object.

Figure 5:
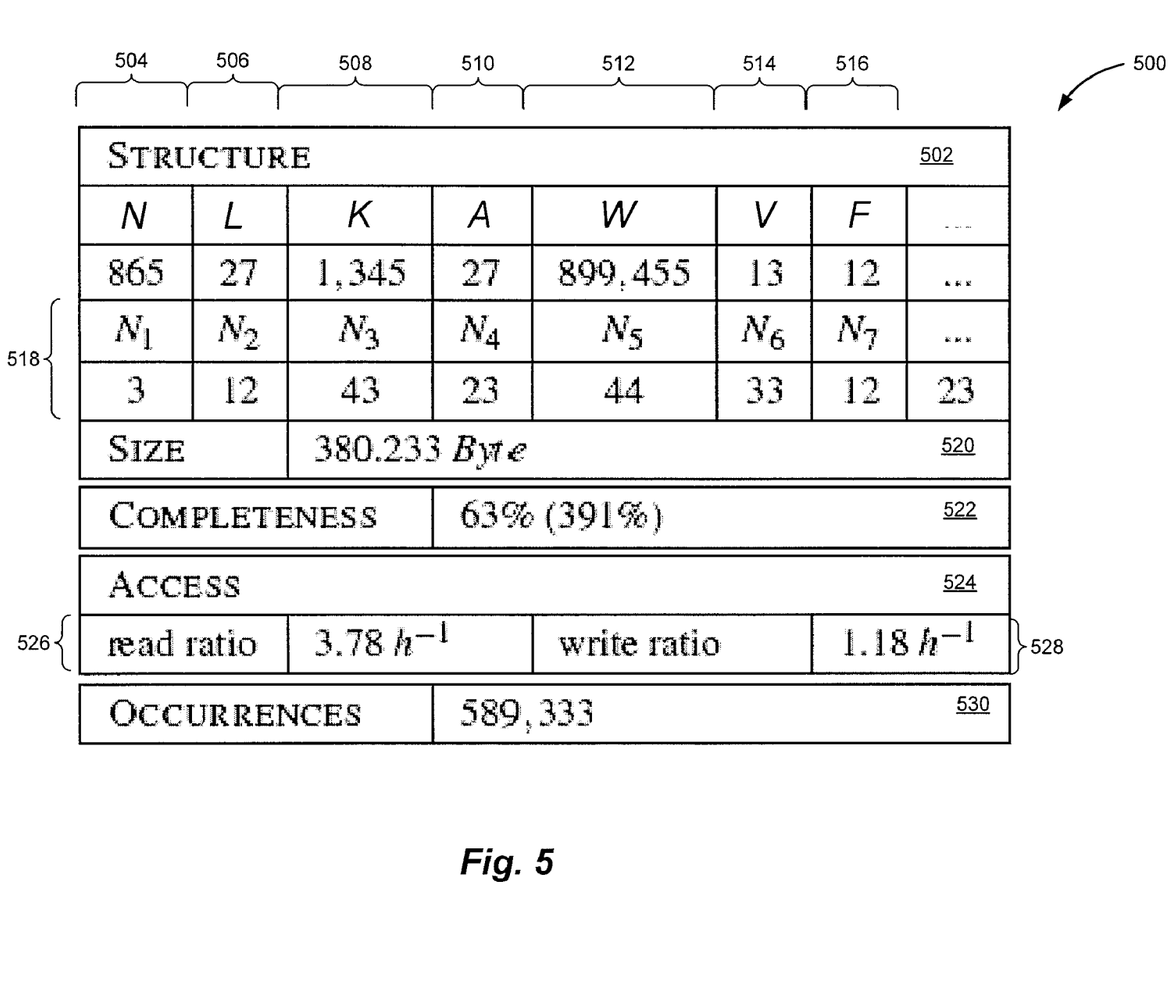
FIG. 5 is a table illustrating an exemplar profile in accordance with implementations of the present disclosure.

Referring now to FIG. 5, an exemplar profile 500 is illustrated. The exemplar profile of FIG. 5 is provided as a sales order profile. In general, business object instances are profiled to obtain structure model parameters. The profile 500 is organized by a structure 502. The structure 502 includes model parameters, such as (N) 504, (L) 506, (K) 508, (A) 510, (W) 512, (V) 514, (F) 516, and (N$_l$) 518. The parameters each represent an aspect of the structure. Namely, (N) 504 represents the number of nodes; (L) 506 represents the number of levels; (K) 508 represents the number of attributes; (A) 510 represents the maximum number of positions; (W) 512 represents the size of all attributes in bytes; (V) 514 represents the total size of leaf nodes; (F) 516 represents the number of links; (N$_l$) 518 represents a number of nodes at a level (l). Other model parameters are also covered including a value for the size 520 of the complete business object, a completeness value 522 including optional elements and cardinalities in parentheses, access parameters 524 including a read ratio 526 and a write ratio 528, and occurrence criteria 530 are also included. Other parameters may be included in the profile 500. In some cases, other parameters of the business object model 404 and profile 500 may be determinable from business object instances directly.

The structure of business objects can be profiled upon instantiation of the business object, at run time, or another time. The profiles can be updated as soon as business objects change or upon request. Algorithms can be used iteratively to obtain a complete structure profile of a particular business object node. The parameters for the number of nodes (N) 504, levels (L) 506, attributes (K) 508, and links (F) 516 can be collected upon detecting a change in a business object. In addition, the size of the attributes (W) 512 and values (V) 514 can be determined. Furthermore, the parameters for certain nodes, positions, and levels can also be collected. Therefore, the indexes levels, node (n), and position in a node (l) can be used to determine any or all parameters.

An update to the structure profile can be executed in a similar manner. For example, adding and deleting of elements increases and decreases parameter values. The modification of elements generally only affects the parameters for the size of the elements. The read ratio 526 can be logged during system operation. The write ratio 528 can be determined from timestamps and versioning of business objects. In addition, if the schema of a business object is available, the completeness can be determined with a comparison of the profile 500 and the business object schema.

Figure 6:
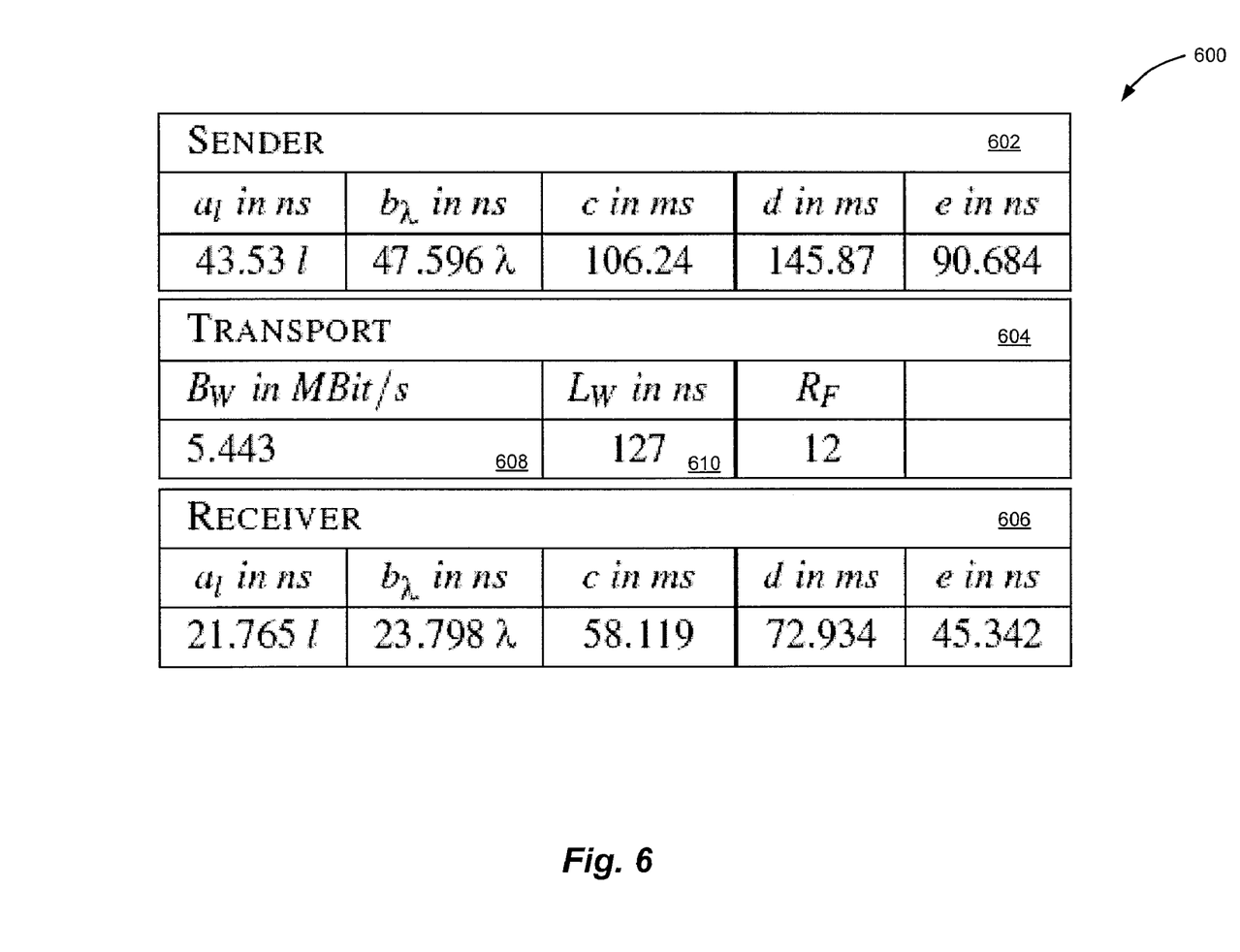
FIG. 6 is a table illustrating an exemplar system profile in accordance with implementations of the present disclosure.

Referring now to FIG. 6, a table illustrating an exemplar system profile 600 is depicted. Parameters are also used to define and determine a system profile. The parameter determination to provide a system profile can be performed before operational mode of the business objects. The system profile 600 can include costs for processes at a sender 602, transport parameter costs 604, and receiver costs 606. The exemplar system profile 600 is shown with a selection of parameters. The synchronization process steps at the sender 602 and the receiver 606 can be measured during execution. A bandwidth (BW) 608 and a latency (LW) 610 for transportation of synchronization messages can be determined by sending normalized messages.

The sender profile 602 lists parameters for the processing time of a node in dependency of the level (a$_l$), the processing time (in nanoseconds or milliseconds) for an attribute in dependency of the position within a node (b$_\lambda$), and other determined parameters. The parameters can be determined, for example, by measuring business object documents that were individually created. The receiver profile 606 can be determined in a similar manner.

According to the exemplar business object model, the processing time for a business object depends on a time for an offset, the processing time for all nodes, attributes, values, and links. With the consideration of a particular business object structure and the processing time of the business object at a sender, the total time at the sender T$_S$ 602 can be defined by the following equation:

$$T_S = T_{offset} + T_{nodes} + T_{attributes} + T_{values} + T_{links}$$

The equations provided herein use a particular notation that includes $(a_{l,v}=a_l)$, which represents the processing time for a node without any attributes is the same for all nodes V at level l; $(b_{n,\lambda}=b_\lambda)$, which represents the processing time for an attribute with a fixed size at position λ for all nodes n; $(c_{n,\lambda}=c)$, which represents the processing time for the attribute content for all nodes n at all levels l; $(d_n=d)$, which represents the processing time for node values at all nodes n; and $(e_n=e)$, which represents the processing time for solving a link all nodes n.

The time for the offset $T_{offset}$ may be caused by the time to load and access a particular business object document. The time for the offset may also include the time to access a root node of the profile. The time for the offset is typically a constant value for all business objects. The sum of the processing time of all nodes at all levels and positions can be described as:

$$T_{nodes} = \sum_{l=0}^{L}\sum_{v=0}^{N_l}(a_{l,v})$$

In some implementations, all child nodes on a single node can be processed in one cycle. The processing can be performed in one cycle, because the processing time for nodes at the same level is typically constant. However, the child nodes of each individual node can be processed separately. This separate calculation can require additional time and effort. Consequently, the processing time for node at a higher level increases for each additional level (e.g., $a_l < a_{l+1}$). At some point, the processing time becomes the same for all nodes at the same level. With the business object parameter $N_l$ (number of nodes 504), the processing time at each node can be determined using the following equation:

$$T_{nodes} = \sum_{l=0}^{L}(N_l \times a_l)$$

The processing time for one attribute may depend on the constant part $b_{n,\lambda}$ and the size $W_{n,\lambda}$. Accordingly, the sum of the processing of all attributes of a business object at all nodes and all positions can be determined using the following equation:

$$T_{attributes} = \sum_{n=0}^{N}\sum_{\lambda=1}^{K_P} b_{n,\lambda} + W_{n,\lambda} \times c_{n,\lambda}$$

Similar to the processing of nodes at one level, the processing times of attributes at a position λ is equal for all nodes. The positions of attributes can be compared with the levels the nodes are placed. Accordingly, the fixed value $b_{n,\lambda}$ is the same for all nodes (e.g., $b_{n,\lambda}=b_\lambda$) and increases for higher positions (e.g., $b_\lambda < b_{\lambda+1}$). The processing time for the variable value is the same at all nodes and positions. The sum of the size of all values can be multiplied by a general value c. In combination with the business object model parameters $K_n$, $K_\lambda$ and W, the following equation can be used to determine the processing time for all attributes:

$$T_{attributes} = \sum_{\lambda=1}^{K_n}(K_\lambda \times b_\lambda) + W \times c$$

The sum of the processing of all values can be calculated as:

$$T_{values} = \sum_{n=0}^{N}(v_n \times d_n)$$

The size of all values is the business object model parameter V. The equation for the processing of all values can be simplified as:

$$T_{values} = V \times d$$

The sum of the processing of all links can be calculated as:

$$T_{links} = \sum_{n=0}^{N} e_n$$

The equation for the processing of all links can be simplified as:

$$T_{links} = F \times e$$

Once the business object model and the cost model are established, the business objects and the systems used in a replicated environment can be profiled. The profiles can be processed using the cost model. To begin, a parsing time ($T_S$ at the sender side) of a particular business object can be determined. Combining the above calculations together (e.g., $T_{nodes}$, $T_{attributes}$, $T_{values}$, $T_{links}$), the processing time for all elements of a business object can be used in the equation for the processing time of a business object on the sender side:

$$T_S = T_{offset} + \sum_{l=0}^{L}(N_l \times a_l) + \sum_{\lambda=1}^{K_n}(K_\lambda + b_\lambda) + W \times c + V \times d + F \times e$$

The equation $T_S$ enables the processing time of a business object to be determined using the knowledge of the business object model, and the system model. The result can be used to predict the processing time for business objects and shows the influence of the business object structure. In this example, $T_R$ is calculated accordingly but with the parameters of a receiver system profile. In some implementations, all times are calculated at the sender side.

Figure 7:
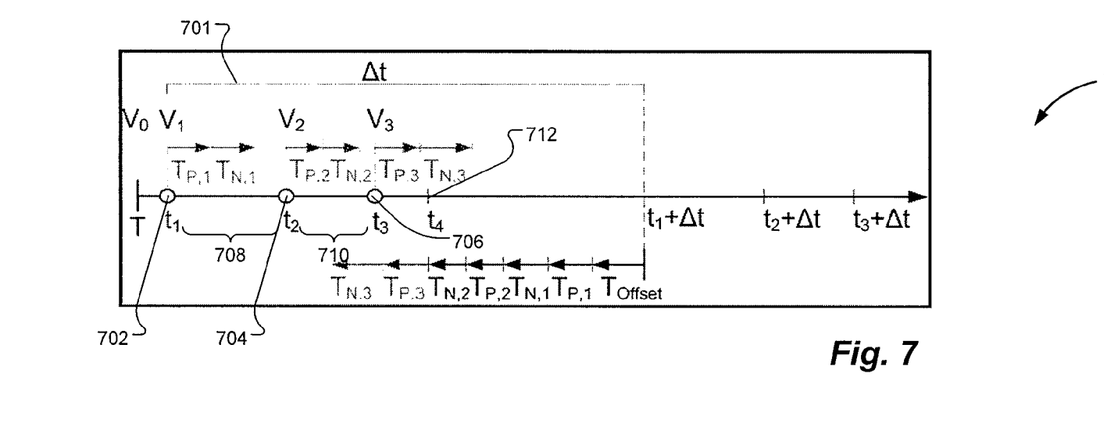
FIG. 7 is an exemplar timeline depicting delay for a synchronization message in accordance with implementations of the present disclosure.

Referring now to FIG. 7, an exemplar timeline 700 illustrates exemplar synchronization message delays. The delays are typically calculated to ensure that consistency constraints for business objects are met. In some implementations, the delay calculations may be used to determine whether to bulk one or more synchronization messages together in a single message. Bulking messages together can provide a reduction in network traffic and overhead time used for each single message.

The delay calculation may include implementing a cost model to predict the time required for a particular business object synchronization process. Accordingly, the latest possible point in time to send a synchronization message for a particular change can be determined. For example, synchronization messages containing independent changes can be bulked, implying that no change will be overwritten.

Coherency predicates for consistency can be introduced into a cost model. For example, a version distance, a value divergence, and a temporal distance can be used to determine if a business object replica is still valid after a master business object has been changed. The predicates ensure that a distance between the business object versions is not exceeded, the differences of the business object content are present, and a certain amount of time is not exceeded. The bulking of changes results in a delay for synchronization messages. Therefore, the temporal distance $\Delta t$ 701 for the replicas may not be exceeded to fulfill the consistency constraints. In the following example, it can be assumed that the temporal distance $\Delta t$ is constant for all business objects. The temporal distance defines the maximum time until a change of a business object has to be incorporated at a particular replica.

With continued reference to FIG. 7, three changes of a business object at a random time include updates in time from $(V_0$ to $V_1)$, $(V_1$ to $V_2)$, and $(V_2$ to $V_3)$. In particular, the version of the business object changes at time $t_1$ 702, time $t_2$ 704, and again at time $t_3$ 706. The changes are committed at the times $t_1$ 702, time $t_2$ 704, and time $t_3$ 706. Once a change is committed, the temporal distance for each change may not exceed $t_1+\Delta t$ for $V_1$, exceed $t_2+\Delta t$ for $V_2$, and exceed $t_3+\Delta t$ for $V_3$. Creating a synchronization message for a changed business object includes the assembling and disassembling of the message header and other overhead data. This process and the transfer of this data are both performed in a fixed amount of time $T_{offset}$.

The exemplar timeline 700 illustrates an example of bulking of the changes of $V_1$ and $V_2$. Both changes may be included in one synchronization message. Due to the temporal consistency restriction, the time $t_1+\Delta t$ may not be exceeded. Therefore, the time $T_{offset}$ required for processing and transferring the synchronization message can be considered. In addition to $T_{offset}$, times 708 for processing the synchronization message of the first change $T_{P,1}$ and the transfer item $T_{N,1}$ are also considered. The times 710 for the second change are shown as $T_{P,1}$ and $T_{N,1}$. In this example, an additional offset for the second change is not necessary because the change can be sent within the same synchronization message. All values can be determined with the help of the cost model and the synchronization message can send a message with a time elapse of $(t_4)$ 712. The time $t_4$ 712 may be calculated using the following equation:

$$t_4 = (t_1 + \Delta t) - (T_{offset} + T_{P,1} + T_{N,1} + T_{P,2} + T_{N,2})$$

In the above example, the third change at $t_3$ 706 cannot be included in the same synchronization message, because the sum of all processing times, all transfer times, and the offset exceeds the time left between $t_3$ and $t_1+\Delta t$. Bulking all three changes in one synchronization message would violate the temporal distance $\Delta t$ 701 for the first change $V_1$.

Figure 8:
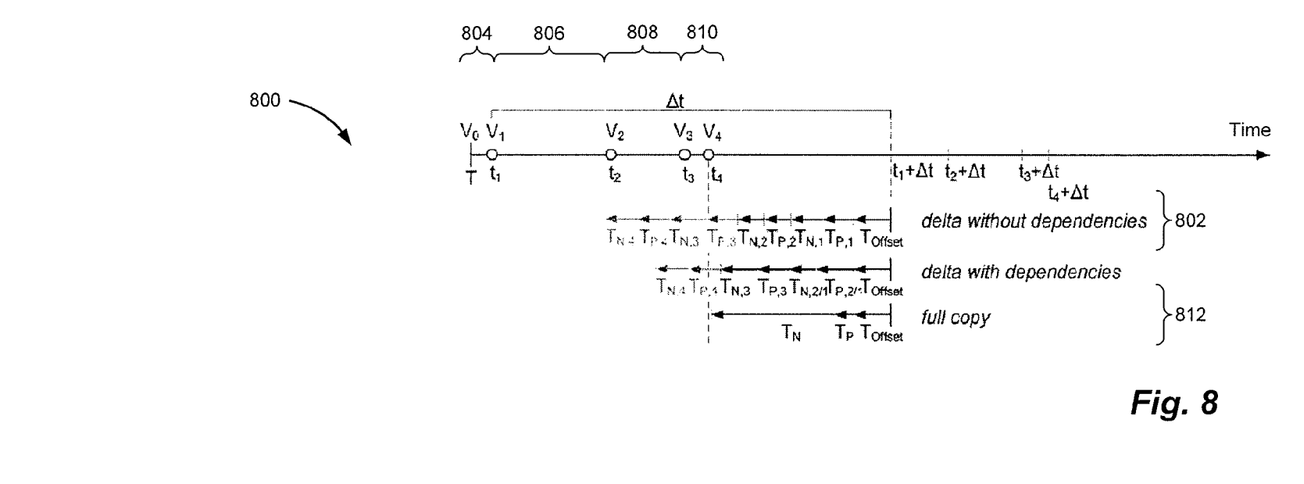
FIG. 8 is an exemplar timeline comparing update times for multiple methods of updating a business object in accordance with implementations of the present disclosure.

The previous example was given for one business object with a fixed size. The method to find the trade-off considers the relative delta (i.e., size(delta) and size(full)). Referring now to FIG. 8, an exemplar timeline 800 is depicted comparing update times for updating a delta versus a full copy transfer of a business object. In this example, the timeline 700 has been updated with a fourth change to version $V_4$ at time $t_4$. A first case 802 depicts bulking several changes without dependencies. Here, just the delta values are used ensuring that the amount of update messages can be reduced. A temporal distance is not exceeded when the first change 804 and second change 806 are bulked. Bulking the third change 808 or fourth change 810 in the same message would exceed the temporal distance for the first change 804. Assuming that the changes of version $V_1$ are fully reverted in version $V_2$, the third change 808 could be bulked in the same message, as well. The processing and transfer times of the first change 804 can be saved, but the details of the fourth change 810 can not be included. As shown, the synchronization of a full copy 812 of business object version $V_4$ would be possible at time $t_4$ without exceeding the temporal distance of the version $V_1$. Consequently, a full copy 812 replication of the business object would be adequate in this example.

Figure 9:
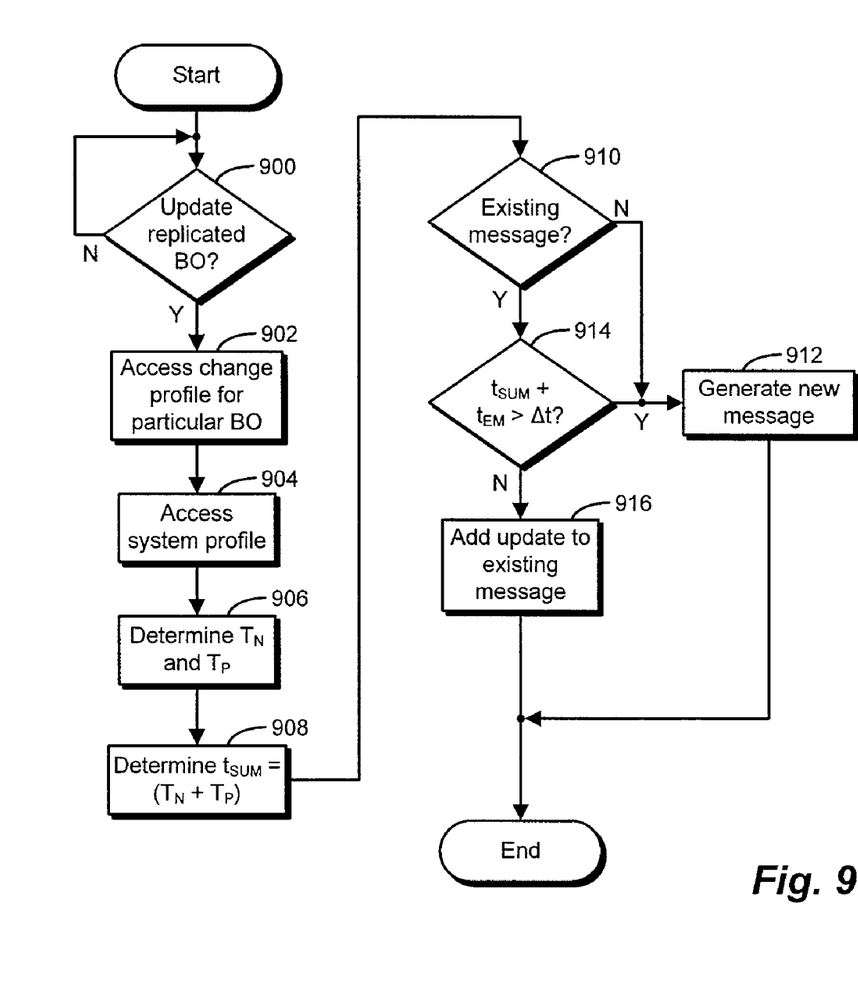
FIG. 9 is a flowchart illustrating exemplar steps that can be executed to adaptively synchronize business objects in accordance with implementations of the present disclosure.

Referring now to FIG. 9, exemplar steps that can be implemented to synchronize replicated business objects will be described. In step 900, it is determined whether at least one replicated business object is to be updated. If the at least one replicated business object is not to be updated, the steps loop back. If the at least one replicated business is to be updated, a change profile the particular business object is accessed in step 902. In step 904, a system profile is accessed, which system profile corresponds to the system through which an update message including changes to the business object is to be transmitted. The times $T_N$ and $T_P$, discussed in detail above, are determined based on the business object profile and the system profile in step 906. In step 908, a temporal sum $(t_{SUM})$ is calculated based on $T_N$ and $T_P$.

In step 910, it is determined whether there is an existing message in a message queue. If there is not an existing message, the steps continue in step 912. If there is an existing message, the steps continue in step 914. In step 912, a new message is generated, which new message includes the change details for the business object to be updated, and the steps end. In step 914, it is determined whether the sum of $t_{SUM}$ and a time of the existing message $(t_{EM})$ exceeds a temporal constraint $(\Delta t)$. If the sum of $t_{SUM}$ and $t_{EM}$ exceeds $\Delta t$, the steps continue in step 912, as discussed in detail above. If the sum of $t_{SUM}$ and $t_{EM}$ exceeds $\Delta t$, the change details for the business object to be updated are added to the existing message in step 916, and the steps end.

Figure 10:
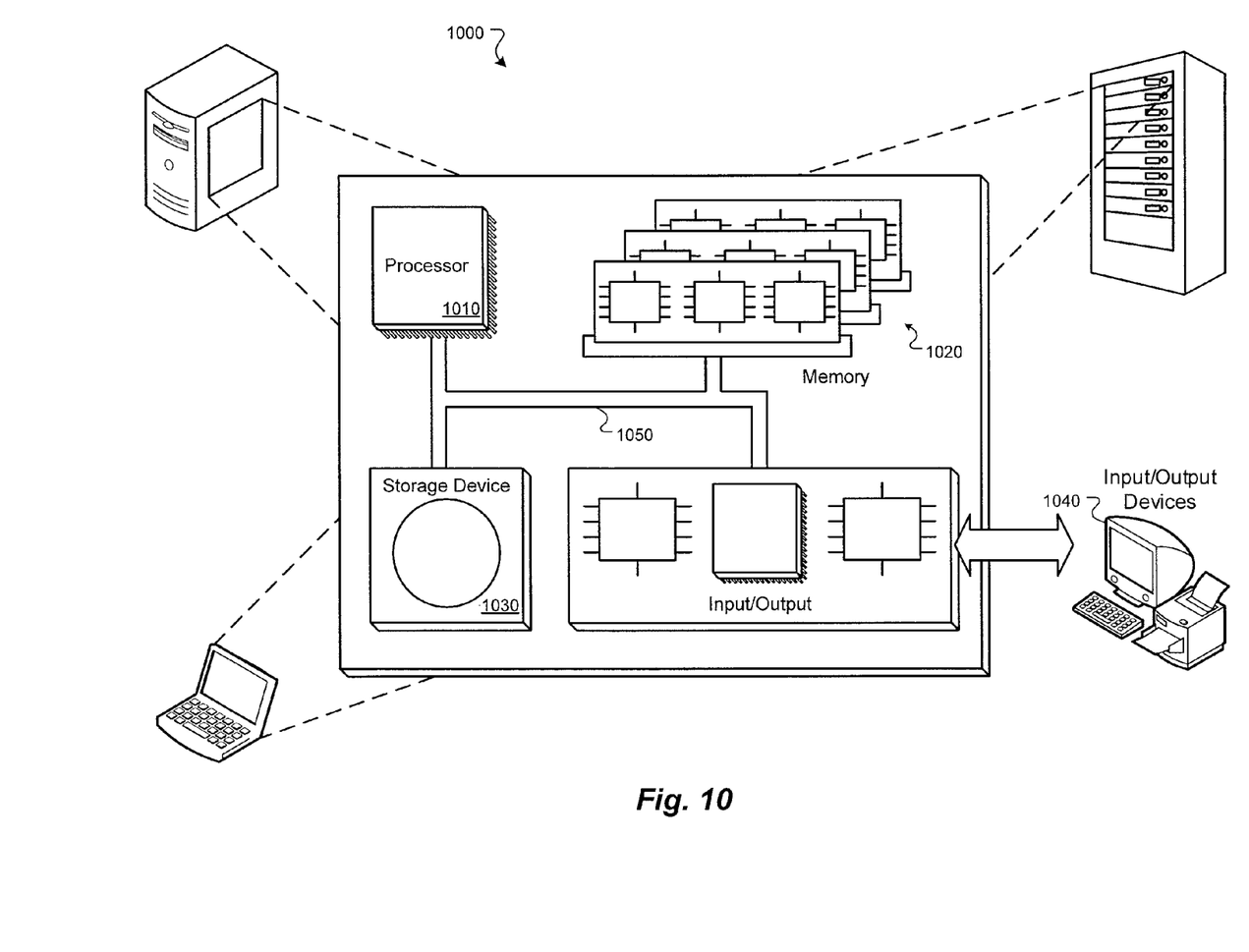
FIG. 10 is a schematic illustration of exemplar computer systems that can be used to execute implementations of the present disclosure.

Referring now to FIG. 10, a schematic diagram of an exemplar computer system 1000 is provided. The system 1000 can be used for the operations described in association with the implementations described herein. For example, the system 1000 may be included in any or all of the server components 108, 110, 202, 204, 206, or 208. The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit. The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device. The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A method for adaptively synchronizing a change to a business object, comprising:
    changing a master business object that is resident at a first location on a network;
    generating a change message for changing a replicated business object, the replicated business object being based on the master business object and being resident at a second location on the network remote from the first location;
    determining an update duration for updating the replicated business object, wherein the update duration is determined based on:
        a first duration corresponding to a time required to identify changes to the master business object and assemble the synchronization message at the first location,
        a second duration corresponding to a time required to transfer the synchronization message from the first location to the second location, and
        a third duration corresponding to a time required to process and integrate changes to the replicated business object at the second location,
    incorporating the change message into a synchronization message when the update duration is less than a temporal constraint; and
    transmitting the synchronization message from the first location to the second location to update the replicated business object based on the synchronization message,
    wherein the method is performed using one or more processors.

2. The method of claim 1, further comprising generating a business object profile, wherein the update duration is determined based on the business object profile.

3. The method of claim 1, further comprising generating a system profile based at least in part on the network, wherein the update duration is determined based on the system profile.

4. The method of claim 1, further comprising:
    determining that an existing synchronization message is present;
    adding the change message to the existing synchronization message when a sum of the update duration and a second update duration is less than the temporal constraint, the sum of update durations being associated with the existing synchronization message; and transmitting the existing synchronization message from the first location to the second location to update the replicated business object based on the existing synchronization message.

5. The method of claim 1, further comprising:
determining that an existing synchronization message is present; and
generating the synchronization message as a new synchronization message when a sum of the update duration and a second update duration exceeds the temporal constraint, the second update duration being associated with the new synchronization message.

6. The method of claim 1, wherein the change routine includes one of a complete change of the replicated business object, and an incremental change of the replicated business object.

7. A computer-readable storage medium coupled to one or more processors having instructions stored thereon which, when executed by the one or more processors, cause the one or more processors to perform operations comprising:
changing a master business object that is resident at a first location on a network;
generating a change message for changing a replicated business object, the replicated business object being based on the master business object and being resident at a second location on the network remote from the first location;
determining an update duration for updating the replicated business object, wherein the update duration is determined based on:
a first duration corresponding to a time required to identify changes to the master business object and assemble the synchronization message at the first location,
a second duration corresponding to a time required to transfer the synchronization message from the first location to the second location, and
a third duration corresponding to a time required to process and integrate changes to the replicated business object at the second location,
incorporating the change routine into a synchronization message when the update duration is less than a temporal constraint; and
transmitting the synchronization message from the first location to the second location to update the replicated business object based on the synchronization message.

8. The storage medium of claim 7, wherein the operations further comprise generating a business object profile, and wherein the update duration is determined based on the business object profile.

9. The storage medium of claim 7, wherein the operations further comprise generating a system profile based at least in part on the network, and wherein the update duration is determined based on the system profile.

10. The storage medium of claim 7, wherein the operations further comprise:
determining that an existing synchronization message is present;
adding the change message to the existing synchronization message when a sum of the update duration and a second update duration is less than the temporal constraint, the sum of update durations being associated with the existing synchronization message; and
transmitting the existing synchronization message from the first location to the second location to update the replicated business object based on the existing synchronization message.

11. The storage medium of claim 7, wherein the operations further comprise:
determining that an existing synchronization message is present; and
generating the synchronization message as a new synchronization message when a sum of the update duration and a second update duration exceeds the temporal constraint, the second update duration being associated with the new synchronization message.

12. The storage medium of claim 7, wherein the change routine includes one of a complete change of the replicated business object, and an incremental change of the replicated business object.

13. A system for adaptively synchronizing a change to a business object, comprising:
one or more processors; and
a computer-readable storage medium coupled to the one or more processors having instructions stored thereon which, when executed by the one or more processors, cause the one or more processors to perform operations comprising:
changing a master business object that is resident at a first location on a network;
generating a change message for changing a replicated business object, the replicated business object being based on the master business object and being resident at a second location on the network remote from the first location;
determining an update duration for updating the replicated business object, wherein the update duration is determined based on:
a first duration corresponding to a time required to identify changes to the master business object and assemble the synchronization message at the first location,
a second duration corresponding to a time required to transfer the synchronization message from the first location to the second location, and
a third duration corresponding to a time required to process and integrate changes to the replicated business object at the second location,
incorporating the change message into a synchronization message when the update duration is less than a temporal constraint; and
transmitting the synchronization message from the first location to the second location to update the replicated business object based on the synchronization message.

14. The system of claim 13, wherein the operations further comprise generating a business object profile, and wherein the update duration is determined based on the business object profile.

15. The system of claim 13, wherein the operations further comprise generating a system profile based at least in part on the network, and wherein the update duration is determined based on the system profile.

16. The system of claim 13, wherein the operations further comprise:
determining that an existing synchronization message is present;
adding the change message to the existing synchronization message when a sum of the update duration is less than the temporal constraint, the second update duration being associated with the existing synchronization message; and transmitting the existing synchronization message from the first location to the second location to update the replicated business object based on the existing synchronization message.

17. The system of claim 13, wherein the operations further comprise:

determining that an existing synchronization message is present; and generating the synchronization message as a new synchronization message when a sum of the update duration and a second update duration exceeds the temporal constraint, the second update duration being associated with the new synchronization message.

* * * * *